(12) United States Patent
Bayadroun

(10) Patent No.: US 7,688,009 B2
(45) Date of Patent: Mar. 30, 2010

(54) LED CURRENT CONTROLLER AND METHOD THEREFOR

(75) Inventor: Abdesselam Bayadroun, Tournefeuille (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 11/813,985

(22) PCT Filed: Jun. 29, 2006

(86) PCT No.: PCT/US2006/025365

§ 371 (c)(1),
(2), (4) Date: Jul. 13, 2007

(87) PCT Pub. No.: WO2008/004997

PCT Pub. Date: Jan. 10, 2008

(65) Prior Publication Data

US 2009/0284171 A1   Nov. 19, 2009

(51) Int. Cl.
*H05B 37/02* (2006.01)

(52) U.S. Cl. .................. 315/360; 315/291; 315/247; 315/224; 315/312; 323/282; 323/241; 323/243; 323/277

(58) Field of Classification Search .............. 315/247, 315/200 R, 291, 224, 307, 360, 362, 312; 323/238, 241, 243, 277, 282, 283
See application file for complete search history.

(56) References Cited

U.S. PATENT DOCUMENTS

| | | | | |
|---|---|---|---|---|
| 6,801,146 B2 * | 10/2004 | Kernahan et al. | ............ | 341/122 |
| 6,909,249 B2 * | 6/2005 | Otake | .......... | 315/291 |
| 7,327,098 B2 * | 2/2008 | Chen | .......... | 315/291 |
| 2008/0088346 A1 * | 4/2008 | Coleman | ............ | 327/103 |

* cited by examiner

*Primary Examiner*—Haissa Philogene
(74) *Attorney, Agent, or Firm*—Robert F. Hightower

(57) ABSTRACT

In one embodiment, an LED current control circuit is configured with a sample and hold circuit that samples an error signal of an error amplifier during one time and holds the sampled value during a second time.

15 Claims, 3 Drawing Sheets

LED CURRENT CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to build boost mode driving circuits for light emitting diodes (LEDs). The boost mode driving circuit was used to regulate the current through the LED in order to control the light intensity of the LED. For some applications, the boost mode driving circuit had a control pin that was pulsed in order to control the current, thus, the light intensity of the LED. During the operation, there were current spikes or inrush current. In some cases, the in-rush current disturbed the control circuit operation and reduced the accuracy of the current control. The in-rush current increased the power dissipation of the system and could also cause undesirable electromagnetic radiation (EMI).

Accordingly, it is desirable to have an LED controller that minimizes inrush current, that minimizes EMI, and that more accurately controls the current through the LED.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
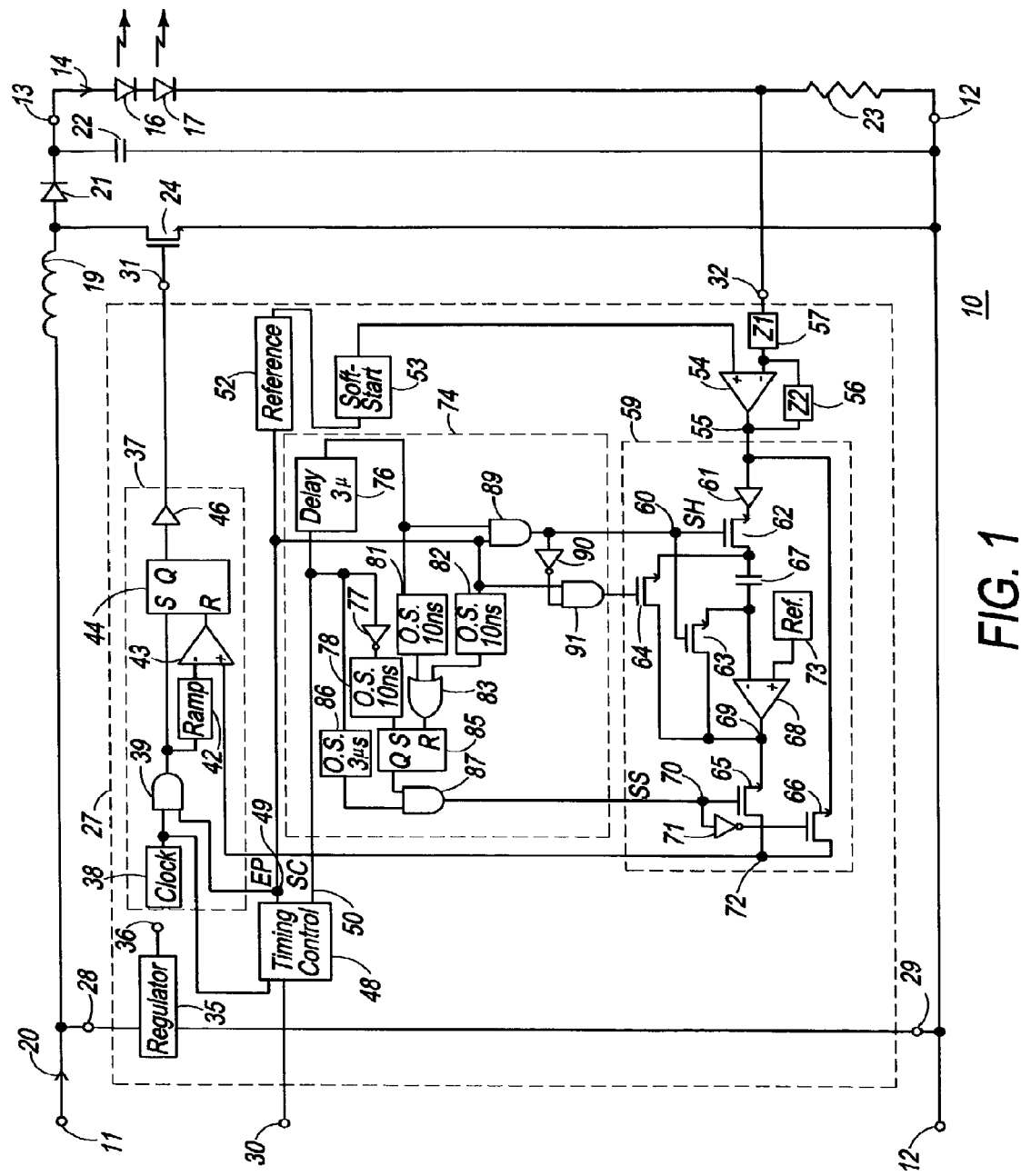
FIG. 1 schematically illustrates an embodiment of a portion of an LED system that includes a LED controller in accordance with the present invention.

FIG. 1 schematically illustrates an embodiment of a portion of an LED system 10 that includes an exemplary form of a boost mode LED controller 27. In the exemplary embodiment, controller 27 includes a sample and hold circuit that samples an input signal, holds a sampled value of the input signal responsively to a state of a control signal to form a held value, and couple the held value to an output for a first time interval after the control signal transitions to another state. System 10 generally receives power from a DC power source, such as a battery, between a power input terminal 11 and a power return terminal 12. System 10 usually is configured to control the value of a current 14 that flows through an LED, such as plurality of LEDs 16 and 17, in order to control the intensity of light generated by LEDs 16 and 17. System 10 may also include an energy storage inductor 19, a rectifier, such as a diode 21, a storage capacitor 22, a power switch such as a transistor 24, and a current sense element, such as a resistor 23.

Controller 27 may receive operating power between a voltage input 28 and a voltage return 29 that typically are connected to respective terminals 11 and 12. Controller 27 is configured to receive a control signal on a control input 30 and form a switching drive signal on an output 31 that has a series of pulses with a duty cycle that is varied to control transistor 24 and form current 14 to a desired value responsively to the control signal on input 30 and to a sense signal received on input 32. The switching of transistor 24 also causes variations in a current 20 that is supplied by the power source connected between terminals 11 and 12. In the preferred embodiment, transistor 24 is switched at a frequency no greater than about two Megahertz (2 MHz). The sense signal received on an input 32 is representative of the value of current 14. The exemplary form of controller 27 includes a timing control circuit or timing control 48, a switching control circuit 37, a reference generator or reference 52, an error amplifier 54, a sample/hold circuit 59, and a sample/hold logic circuit or sample/hold logic 74. In most embodiments, controller 27 also includes a soft-start circuit or soft-start 53 and an internal voltage regulator 35 that is coupled between input 28 and return 29 to receive the voltage from input 28 and form an internal operating voltage on an output 36 that is suitable for operating the elements of controller 27, such as the elements of logic 74. Circuit 37 generally includes a clock generator or clock 38, control logic such as an AND gate 39, a ramp generator or ramp 42, a comparator 43, a latch 44, and a buffer driver 46. The exemplary form of sample/hold logic 74 includes a delay circuit or delay 76, an inverter 77, an OR gate 83, a latch 85, an AND gate 87, an inverter 90, AND gates 89 and 91, and timing circuits such as one-shots 78, 81, 82, and 86. Sample/hold circuit 59 includes a buffer amplifier 61, a sampling capacitor 67, a reference generator (ref) 73, a sample/hold amplifier 68, an inverter 71, and a plurality of switches such as transistors 62, 63, 64, 65, and 66.

Figure 2:
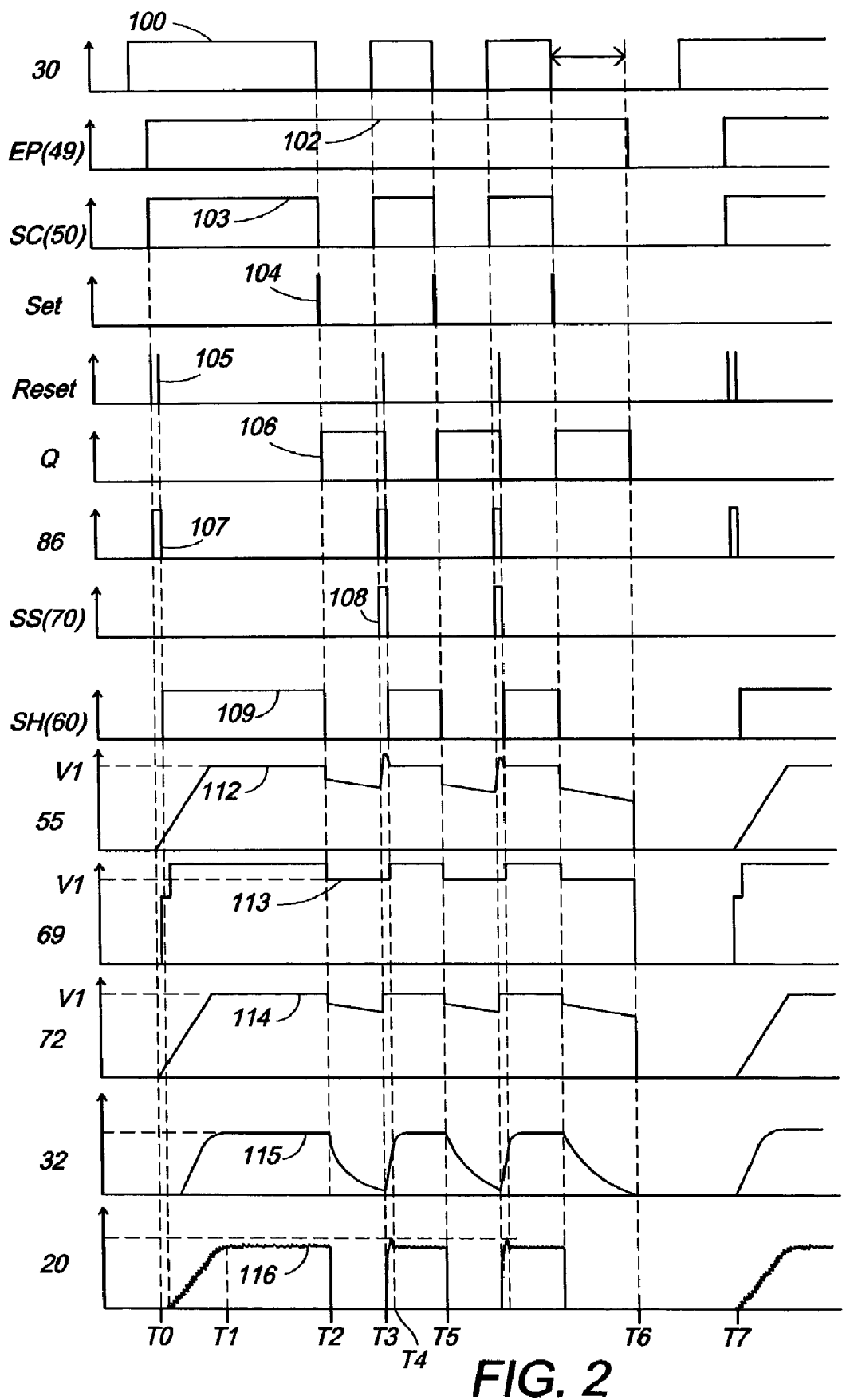
FIG. 2 is a graph illustrating some signals of the LED controller of FIG. 1 in accordance with the present invention.

FIG. 2 is a graph having plots of some signals during the operation of controller 27. The abscissa indicates increasing time and the ordinate of each plot indicates an increasing value of the illustrated signal. A plot 100 illustrates the control signal received on input 30. Plots 102 and 103 illustrate an enable PWM control signal (EP) and a sample control signal (SC) that are formed on respective outputs 49 and 50 of control 48. Plots 104 and 105 illustrates the state of signals received to the respective set and reset inputs of latch 85, and a plot 106 illustrates the state of the Q output of latch 85. A plot 107 illustrates the output of one-shot 86. A plot 108 illustrates a sample select control signal (SS) that is formed on a node 70 by gate 87, and a plot 109 illustrates a sample/hold (SH) control signal that is formed on a node 60 by gate 89. A plot 112 illustrates the error signal on an output 55 of amplifier 54, a plot 113 illustrates a sampled error signal on an output 69 of amplifier 68, and a plot 114 illustrates a composite error signal on an output 72 of circuit 59. A plot 115 illustrates the sense signal on input 32 and a plot 116 illustrates current 20. The signals illustrated by plots 100-109 are digital signals and the signals illustrated by plots 112-116 are analog signals. This description has references to FIG. 1 and FIG. 2.

The control signal on input 30 is used for enabling and disabling controller 27 in addition to controlling the intensity of light from LEDs 16 and 17. The control signal is pulsed at a particular frequency that usually is less than the frequency of clock 38 as illustrated by plot 100. For example, the frequency of the clock signal from clock 38 may be about two (2) MHz and the frequency of the control signal may be about one (1) KHz. The length of time that the control signal is operated at the frequency determines the amount of light produced by LEDs 16 and 17. When the control signal goes high, controller 27 begins forming the switching drive signal to regulate the value of current 14. Controller 27 continues to form the switching drive signal as long as the control signal continues to switch. Thus, the longer the duration of the pulses of the control signal, the more intense is the light emitted by LEDs 16 and 17. When the control signal on input 30 is low for an extended time period (referred to as the time-out period), controller 27 stops generating the switching drive signal and prevents current 14 from flowing through LEDs 16 and 17, as illustrated at a time T6. The time-out period usually occurs if the control signal stays low for more than the period of the control signal. In the preferred embodiment, the time-out period is approximately two hundred fifty micro-seconds.

Controller 27 is configured to operate in two operating modes, a soft-start mode and a normal mode that are controlled by the control signal. When the control signal goes high after being low for at least the time-out period, controller 27 begins operating in the soft-start mode, illustrated between time T0 and T1. In the soft-start mode, control 48 does not switch the SC signal and the SS signal at node 70 is held low to couple the output of amplifier 54 to comparator 43. After the soft-start mode expires at approximately T1, controller 27 begins operating in the normal mode and begins switching SC to follow the control signal. The soft-start mode usually lasts until the sense signal on input 32 reaches a steady state. In the preferred embodiment, the soft-start mode lasts until the sense signal reaches approximately two hundred fifty millivolts. As will be seen further hereinafter, in the normal mode circuit 59 is configured to operate in a sampling phase or in a holding phase of operation responsively to respective asserted and negated values of the sampling/hold control signal (SH) formed on node 60 by logic 74. Additionally, circuit 59 is configured to by-pass the sampling/hold section of circuit 59 and select output 55 of amplifier 54 to comparator 43 responsively to a negated value of the sample select control signal (SS) formed on node 70 by logic 74 and to select a sampled signal on output 69 of amplifier 68 to comparator 43 responsively to an asserted value of SS.

In operation and assuming that the control signal was low for more than the time-out period, when the control signal first goes high to begin a light control cycle, controller 27 begins operating in the soft-start mode. Control 48 forces the enable PWM signal (EP) on output 49 high to enable circuit 37 to generate switching drive signals on output 31. Control 48 keeps EP high to generate switching drive signals until the control signal goes low for at least the time-out period. Logic 74 keeps the SS signal on node 70 low during the soft-start mode to avoid placing circuit 59 in the holding phase during the soft-start mode of operation. The high EP signal enables gate 39 and enables circuit 37 to form the switching drive signal. The high EP signal also enables reference 52 to provide the reference signal, through soft-start 53, to the non-inverting input of amplifier 54. Soft-start 53 receives the reference signal and gradually increases the value of the reference signal applied to error amplifier 54 over the time of the soft-start mode, in order to gradually increase the value of current 14. The high EP signal also enables one-shot 82 which resets latch 85 and forces the SS signal on node 70 low. The low SS signal by-passes the sample/hold portion of circuit 59 by enabling transistor 66 to couple output 55 of amplifier 54 to output 72 and to comparator 43. Error amplifier 54 receives the sense signal from input 32 and forms an error signal representing the difference between the sense signal and the slowly increasing value of the reference signal from soft-start 53 thereby slowly increasing current 14. The high SC signal at time T0 is received by inverter 77 which forces the output low. This has no effect on one-shot 78 or on latch 85. The SC signal also propagates through delay 76 and triggers one-shot 81 to force the reset input of latch 85 high which has no effect since the EP signal previously reset latch 85. The SC signal also triggers one-shot 86 (plot 107) which has no effect on gate 87 or node 70 because latch 85 is reset. The SC signal as delayed by delay 76 forces the output of gate 89 and the SH control signal on node 60 high as illustrated by plot 109. The high SH signal forces the output of inverter 90 low and the output of gate 91 low to disable transistor 64. The high SH signal also enables transistors 62 and 63 to couple the error signal from amplifier 54 to one side of capacitor 67 and the output of amplifier 68 to the other side of capacitor 67. This is the sampling mode that charges capacitor 67 to a value approximately equal to the value of reference 73 (Vref) minus the dc value of the error signal from output 55 (Vref−V1 where V1 is the dc value of the error signal on output 55). SC remains high during the soft-start period to ensure that the error signal applied from amplifier 54 reaches its full value and charges capacitor 67 to that same full value.

After the soft-start period expires around time T1, control 48 switches the sampling control signal (SC) on output 50 to follow the switching of the control signal. It has been found that each transition of the control signal after the soft-start period has expired disturbs the value of the error signal formed by amplifier 54 and causes variations in the value of current 14. This also causes in-rush currents of current 20 from the voltage source connected to terminal 11. These inrush currents cause EMI that disturbs the operation of other circuits connected to terminal 11. Circuit 59 and logic 74 are configured to minimize these variations. Sample/hold logic 74 and sample/hold circuit 59 are configured to minimize overshoot in the error signal received by comparator 43 for each subsequent transition of the control signal received on input 30. After the soft-start period, SC begins following the control signal and goes low at time T2 responsively to the control signal. The low SC signal forces the output of inverter 77 high and sets latch 85 forcing the Q output high which has no effect on node 70 because one-shot 86 is still low. The low SC signal propagates through delay 76 and forces the output of gate 89 and node 60 low to switch circuit 59 to the holding mode by disabling transistors 62 and 63 and forcing the output of gate 91 high to enable transistor 64. Disabling transistors 62 and 63 and enabling transistor 64 causes circuit 59 to hold the value of (V1−(Vref−V1))=V1 on node 69, thus, the value that was on output 55 when node 60 went low. Node 70 remains low and transistor 66 remains enabled to couple the error signal on output 55 to output 72 and to comparator 43.

The next control signal goes high approximately at time T3 which forces the SC signal of control 48 high. The high SC signal enables one-shot 86 which forces SS on node 70 high since latch 85 is set. SS being high disables transistor 66 and enables transistor 65 to couple the stored error signal from output 69 of amplifier 68 to comparator 43. After the time-out of one-shot 86 expires, SS goes low to enable transistor 66 and disable transistor 65 and couple the error signal from amplifier 54 to comparator 43. This facilitates using the stored value of the error signal during and just after the rising edge of the control signal and minimizes the disturbances to the error signal used by comparator 43. Thus, the time-out of one-shot 86 is selected to be greater than the amount of time that the error signal from amplifier 54 is disturbed after the rising edge of the control signal. Using the stored value (V1) of the error signal for a time interval after the rising edge of the control signal before switching to use the value on output 55 assists in minimizing disturbances to the error signal received by comparator 43. The high SC signal from control 48 also propagates through delay 76 and subsequently enables one-shot 81 to reset latch 85. Note that the time delay of delay 76 is at least equal to the period of one-shot 86 to ensure that latch 85 does not reset SS until after one-shot 86 times out and before the disturbances to the error signal are settled out. The high from delay 76 also forces node 60 high to once again begin a sampling phase of circuit 59 as illustrated at a time T4. During the sampling phase, transistors 62 and 63 are enabled and transistor 64 is disabled so that output 69 of amplifier 68 is at the value of ref 73. The value of ref 73 is applied to one side of capacitor 67 by output 69 and the error signal from amplifier 54 is applied to the other side of capacitor 67 thereby storing the value of the error signal on capacitor 67 as illustrated by plot 113 at time T2. Using the value of ref 73 forms an offset that assists in keeping the output of amplifier 54 from swinging between the values of the power supply rails such as the value supplied by regulator 35. Subsequently, the control signal on input 30 goes low and forces the SC signal low. The low SC signal forces the output of inverter 77 high which enables one-shot 78 and sets latch 85 at a time T5 which has no effect on SS because one-shot 86 is low. However, latch 85 has enabled gate 87 so that the next rising edge of the control signal will trigger one-shot 86 and force SS high again to mask the disturbances of the error signal caused by the switching of the control signal. The low SC signal also forces SH low through gate 89 and forces the output of gate 91 high to begin a holding phase to hold the previous value of the error signal. This holding phase holds the previous value to be ready for the next cycle.

This sequence continues for each cycle of the control signal received on input 30 until the control signal remains low for the time-out period as illustrated at time T6. When the control signal remains low for the time-out period, control 48 forces both outputs 49 and 50 low as illustrated at time T6. The low on output 49 disables controller 27. Additionally, the low on output 49 inhibits generation of switching cycles of the drive signal by blocking the clock signal through gate 39. In order to inhibit the switching drive signal after the time-out period, timing control 48 forces the enable PWM signal (EP) on output 49 low which disables gate 39 and prevents controller 27 from initiating a switching drive signal. At a time T7, another start-up phase begins.

Using the sampled value of the error signal responsively to the positive transition of the control signal minimizes over-shoot in the value of current 20, minimizes errors in the value of current 14, and reduces the power consumption for the operation of controller 27. Sampling the error signal after the value of current 14 has stabilized assists in using the stabilized value of the error signal during the next transition of the control signal. It is believed that controller 27 reduces the over-shoot of current 20 by at least approximately fifty percent (50%).

In order to facilitate this functionality of controller 27, regulator 35 is connected to receive power between input 28 and return 29 and provide the operating voltage on output 36. Control 48 has a first input connected to receive the control signal on input 30 and a second input commonly connected to the output of clock 38 and a first input of gate 39. Output 49 of control 48 is commonly connected to a second input of gate 39, an input of reference 52, a first input of gate 89, an input of one-shot 82, and a first input of gate 91. An output of gate 39 is commonly connected to a set input of latch 44 and an input of ramp 42. The output of ramp 42 is connected to an inverting input of comparator 43 which has an output connected to the reset input of latch 44. The Q output of latch 44 is connected to an input of driver 46 which has an output connected to output 31. Output 50 of control 48 is commonly connected to the input of delay 76, the input of one-shot 86, and the input of inverter 77. The output of one-shot 86 is connected to a first input of gate 87. The output of inverter 77 is connected to the input of one-shot 78 which has an output connected to the set input of latch 85. The Q output of latch 85 is connected to a second input of gate 87. The output of gate 87 is commonly connected to a gate of transistor 65 and an input of inverter 71. An output of inverter 71 is connected to a gate of transistor 66. The output of delay 76 is commonly connected to a second input of gate 89 and an input of one-shot 81. The output of one-shot 81 is connected to a first input of gate 83. The output of one-shot 82 is connected to a second input of gate 83 which has an output connected to the reset input of latch 85. The output of gate 89 is commonly connected to the input of inverter 90, a gate of transistor 62, and a gate of transistor 63. The output of inverter 90 is connected to a second input of gate 91 which has an output connected to a gate of transistor 64. An input of amplifier 61 is commonly connected to output 55 and a source of transistor 66. An output of amplifier 61 is connected to a source of transistor 62 which has a drain commonly connected to a first terminal of capacitor 67 and the source of transistor 64. A second terminal of capacitor 67 is commonly connected to a source of transistor 63 and an inverting input of amplifier 68. A non-inverting output of amplifier 68 is connected to the output of ref 73. Output 69 of amplifier 68 is commonly connected to a source transistor 65, a drain of transistor 63, and a drain of transistor 64. The drain of transistor 66 is commonly connected to output 72, a drain of transistor 65, and a non-inverting input of comparator 43. The output of reference 52 is connected to the input of soft-start 53. The output of soft-start 53 is connected to a non-inverting input of amplifier 54. An inverting input of amplifier 54 is commonly connected to a first terminal of an impedance 57 and a first terminal of an impedance 56. The second terminal of impedance 57 is connected to input 32. An output of impedance 56 is connected to output 55 of amplifier 54.

Figure 3:
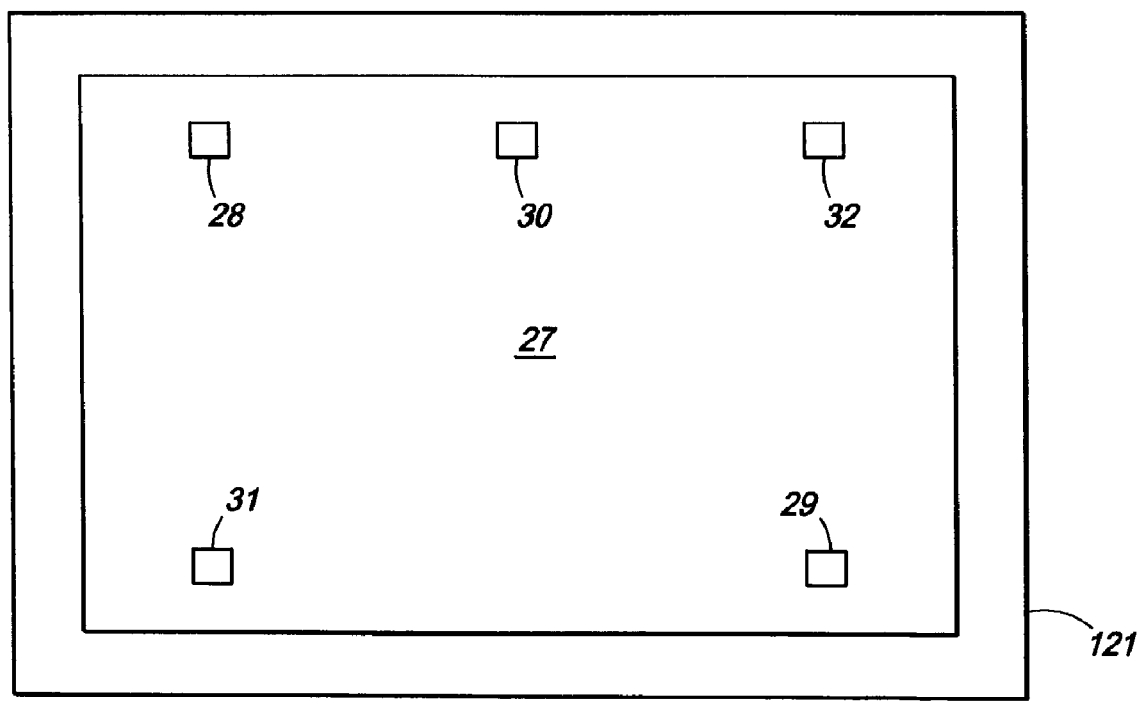
FIG. 3 schematically illustrates an enlarged plan view of a semiconductor device that includes the LED controller of FIG. 1 in accordance with the present invention.

FIG. 3 schematically illustrates an enlarged plan view of a portion of an embodiment of a semiconductor device or integrated circuit 120 that is formed on a semiconductor die 121. Controller 27 is formed on die 121. Die 121 may also include other circuits that are not shown in FIG. 3 for simplicity of the drawing. Controller 27 and device or integrated circuit 120 are formed on die 121 by semiconductor manufacturing techniques that are well known to those skilled in the art. In one embodiment, controller 27 is formed on a semiconductor substrate as an integrated circuit having five external leads as illustrated by FIG. 3.

In view of all of the above, it is evident that a novel device and method is disclosed. Included, among other features, is sampling the error signal from the error amplifier during a time when the load current does not cause disturbances in the output of the error amplifier, and use this stored value to operate the PWM section during a time when the load current may cause disturbances in the output of the error amplifier.

While the subject matter of the invention is described with specific preferred embodiments, it is evident that many alternatives and variations will be apparent to those skilled in the semiconductor arts. For example, the configuration of logic 74 and circuit 59 may have other configurations as long as the error signal is sampled and stored while current 14 is stable and the stored value is used while current 14 is not stable, or another configuration may use different elements to delay circuit 59 from using the error signal for the time interval after the control signal transition high. Additionally, one-shots 78, 81, and 82 may be replaced by other edge detector circuits. Delay 76 may be any circuit that forms a delay as describe in the explanation of FIG. 1 and FIG. 2. One-shot 86 may be replaced by any circuit that forms a pulse having a width that is longer than the overshoot time of current 20. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A current controller for an LED comprising:
a switching control circuit configured to form a switching drive signal to control a current through an LED responsively to a sense signal that is representative of the current;
a first control circuit configured to receive a control signal and responsively enable the switching control circuit to form the switching drive signal, the control signal having a first state during a first time interval and a second state during a second time interval;
an error amplifier coupled to receive the sense signal and form a error signal; and
a sample and hold circuit configured to sample a value of the error signal responsively to a first portion of the first time interval that the control signal is at the first state and hold the value of the error signal responsively to a portion of the second time interval that the control signal is at the second state to form a held value of the error signal, the sample and hold circuit configured to couple the held value to the switching control circuit responsively to a second portion of the first time interval that the control signal is at the first state and couple the error signal to the switching control circuit after the second portion of the first time interval.

2. The current controller of claim 1 wherein the sample and hold circuit is configured to sample the value of the error signal responsively to the first time interval after the control signal transitions to the first state.

3. The current controller of claim 2 wherein the sample and hold circuit includes a delay element that forms the second portion of the first time interval.

4. The current controller of claim 1 wherein the sample and hold circuit is configured to hold the value of the error signal responsively to the second time interval after the control signal transitions to the second state.

5. The current controller of claim 4 further including a first transistor having a first current carrying electrode coupled to receive the error signal, a second current carrying electrode coupled to charge a capacitor, and a control electrode; a second transistor having a first current carrying electrode coupled to receive a signal from the capacitor, a second current carrying electrode, and a control electrode coupled to the control electrode of the first transistor and operably coupled to enable the first and second transistors responsively to the first time interval after the control signal transitions to the first state; and a third transistor having a first current carrying electrode coupled to the second current carrying electrode of the first transistor, a second current carrying electrode coupled to the second current carrying electrode of the second transistor, and a control electrode operably coupled to enable the third transistor responsively to the second time interval after the control signal transitions to the second state.

6. The current controller of claim 1 wherein the sample and hold circuit is configured to couple the held value of the error signal to the switching control circuit until the second portion of the first time interval and to couple the error signal to the switching control circuit after the first portion of the first time interval.

7. The current controller of claim 6 further including a timing circuit coupled to form the second portion of the first time interval responsively to the control signal transition to the first state.

8. The current controller of claim 7 wherein the sample and hold circuit includes a latch configured to be set responsively to the second state of the control signal and to be reset responsively to the second portion of the first time interval.

9. The current controller of claim 8 wherein a delay element is coupled to form the second portion of the first time interval.

10. The current controller of claim 8 further including a first transistor having a first current carrying electrode coupled to receive the error signal, a second current carrying electrode, and a control electrode operably coupled to enable the first transistor after the second portion of the first time interval, and a second transistor having a first current carrying electrode coupled to receive the held value of the error signal, a second current carrying electrode coupled to the second current carrying electrode of the first transistor and to the switching control circuit, and a control electrode operably coupled to enable the second transistor during the second portion of the first time interval.

11. A method of forming a current controller comprising:
coupling a control circuit to control a sample and hold circuit;
configuring the control circuit to receive a control signal and responsively control the sample and hold circuit to sample an input signal that is received on an input of the sample and hold circuit responsively to a portion of a first state of the control signal, to hold a sampled value of the input signal responsively to a second state of the control signal to form a held value, and to couple the held value to an output of the sample and hold circuit for a first time period after the control signal transitions to the first state.

12. The method of claim 11 wherein configuring the control circuit to receive the control signal and responsively control the sample and hold circuit includes configuring the control circuit to form the first time period with a length that is greater than a time required for the input signal on the input to become stable.

13. The method of claim 11 wherein configuring the control circuit to receive the control signal and responsively control the sample and hold circuit includes configuring the control circuit to form the first time period to be approximately three microseconds.

14. The method of claim 11 wherein configuring the control circuit to receive the control signal and responsively control the sample and hold circuit includes configuring the control circuit to couple the output of the sample and hold circuit to a PWM circuit.

15. The method of claim 11 wherein configuring the control circuit to receive the control signal and responsively control the sample and hold circuit includes configuring the current controller to begin a control cycle responsively to the first state of the control signal.

* * * * *